United States Patent
Csipkes et al.

[19]

[11] Patent Number: 5,923,781

[45] Date of Patent: Jul. 13, 1999

[54] SEGMENT DETECTION SYSTEM AND METHOD

[75] Inventors: Andrei Csipkes, Lawrenceville; Muid Ur-Rehman Mufti, Atlanta; John Mark Palmquist, Lilburn, all of Ga.

[73] Assignee: Lucent Technologies Inc., Murray Hill, N.J.

[21] Appl. No.: 08/577,637

[22] Filed: Dec. 22, 1995

[51] Int. Cl.⁶ .................................................. G06K 9/80
[52] U.S. Cl. .......................................... 382/199; 382/218
[58] Field of Search ................................... 382/199, 209, 382/218, 217; 356/345

[56] References Cited

U.S. PATENT DOCUMENTS

| | | | |
|---|---|---|---|
| 4,738,507 | 4/1988 | Palmquist | 350/96.21 |
| 4,738,508 | 4/1988 | Palmquist | 350/96.21 |
| 4,787,698 | 11/1988 | Lyons et al. | 350/96.2 |
| 4,901,362 | 2/1990 | Terzian | 382/199 |
| 5,179,419 | 1/1993 | Palmquist et al. | 356/73.1 |
| 5,537,494 | 7/1996 | Toh | 382/242 |

OTHER PUBLICATIONS

Kim et al. "Representation of a Curved Boundary." Proceedings of the Twenty Third Southeastern Symposium on System Theory. pp. 84–88, Mar. 1991.

Taubin et al. "Representing and Comparing Shapes Using Shape Polynomials." Proceedings CVPR '89 IEEE Computer Society Conference on Computer Vision and Pattern Recognition, pp. 510–516, Jun. 1989.

Keren et al. "Robust Object Recognition Based on Implicit Algebraic Curves and Surfaces." Proceedings of the 1992 IEEE Computer Society Conference on Computer Vision and Pattern Recognition, pp. 791–794, Jun. 1992.

Cohen et al. "Curve Recognition Using B–spline Representation." Proceedings IEEE Workshop on Applications of Computer Vision, pp. 213–220, Dec. 1992.

Subrahmonia et al. "Recognizing Mice, Vegetables and Hand Printed Characters Based on Implicit Polynomials, Invariants and Bayesian Methods." Proceedings Fourth International Conference on Computer Vision, pp. 320–324, May 1993.

*Primary Examiner*—Jon Chang

[57] ABSTRACT

A segment detection system automatically, contactlessly, rapidly, and precisely detects a segment along an edge, such as a boundary, of an object in a digitized image. The segment detection system includes an imager for capturing an image of an object and converting the image into an electrical signal. A computer is connected to the camera for receiving the electrical signal. A machine vision system is associated with the computer and is adapted to analyze the image. A segment detection program is disposed in the computer for driving the computer and the machine vision system in accordance with the present invention. The segment detection program includes an initialization subroutine and a matching subroutine. The initialization subroutine configures the program to search for a particular target polynomial equation. The matching subroutine derives a test polynomial equation that represents a test segment from a test edge of the object based upon an analysis of the image. Further, the matching subroutine determines whether the test segment matches the target segment by comparing corresponding coefficients of the test polynomial equation and the target polynomial equation.

17 Claims, 7 Drawing Sheets

FEATURE OF INTEREST

POLYNOMIAL FIT

SEGMENT DETECTION SYSTEM AND METHOD

FIELD OF THE INVENTION

The present invention generally relates to measurement, testing, and quality control systems, and more particularly, to a shape detection system and method for automatically, contactlessly, rapidly, and precisely detecting a segment of an edge, for example, a boundary, of an object in a digitized image. Although not limited to this application, the segment detection system and method are particularly suited for determining the orientation of an optical connector or device, such as a coupling grip, to be engaged with the connector in a fully automated connector assembly line.

BACKGROUND OF THE INVENTION

In automated assembly lines for producing optical fiber connectors, it is often necessary to find a feature or segment along the periphery of the connector, and particularly, along the fiber or ferrule of the connector. The reason is that sometimes the connector or parts thereof need to be rotated in a proper posture for examination or for engaging another part with the connector. An example of such a requisite procedure involves placement of a coupling grip onto a connector.

A coupling grip is a device that is placed around the end tip of a connector to permit engagement of the connector with a coupling. In the case of a conventional SC optical fiber connector, the coupling grip is a square-shaped sleeve that is slid over the square-shaped periphery of the end tip of the connector and mounted thereto. In order for the square-shaped sleeve to be slid over the square-shaped end tip, the square-shaped coupling grip must be physically oriented in the proper posture with respect to the square-shaped end tip.

One known technique that can be used for determining the orientation of the coupling grip involves pattern matching. In the pattern matching technique, a stored bit pattern of the segment of interest, or the target segment, is compared with a segment in the image, or the test segment. They are compared on a pixel-by-pixel basis, and an error is derived based upon the difference in pixel intensities. The error is then compared to a threshold. If the error falls within a predefined threshold, then a match is concluded. Otherwise, when the error falls outside of the threshold, it is concluded that a match has not occurred, and another segment of the test image is analyzed. Because the very heart of the pattern matching technique uses pixel-based digitization, this technique is very sensitive to noise. Also, in environments where the likelihood of two samples being alike is slim, as in the case of a coupling grip, matches are problematic. Finally, the pattern matching technique is extremely time consuming and impractical for a fully automated assembly line.

Another known technique that could be adapted to determine the orientation of a coupling grip involves the use of a mathematical model known as a Hough transform. Use of a Hough transform is described in U.S. Pat. No. 5,179,419 to Palmquist et al., as an example. The Hough transform is generally a technique for filtering data in an image by defining appropriate data thresholds. This technique could be adapted in order to determine the orientation of an edge of the coupling grip.

Although this technique yields accurate results, it is very computationally intensive, requires an inordinate amount of time, thereby making it impractical for a fully automated connector assembly line, and is limited to first degree polynomial fits, which would make it impractical for discovering segments exhibiting complex patterns, i.e., multiple directions.

SUMMARY OF THE INVENTION

An object of the present invention is to overcome the inadequacies and deficiencies of the prior art as described previously in the background section.

Another object of the present invention is to provide a segment detection system and method for automatically, contactlessly, rapidly, and precisely locating a segment in an edge of an object, for example, but not limited to, an optical fiber connector, an optical fiber, a coupling grip for an optical fiber connector, etc.

Another object of the present invention is to provide a segment detection system and method that can be utilized in a fully automated connector assembly line for locating a segment in an edge of an object.

Another object of the present invention is to provide a segment detection system and method that can be used to locate a segment in an edge of an object and that yield accurate results and are substantially unaffected by noise in a digitized image of the object.

Another object of the present invention is to provide a segment detection system and method that are simple to implement, efficient, and reliable.

Briefly described, the present invention is a segment detection system and method for automatically, contactlessly, rapidly, and precisely detecting a segment along an edge, such as a boundary, of an object in a digitized image. The system and method utilize polynomial equations in order to detect the segment of interest. Any feature of an object can be approximated to an arbitrary accuracy by a polynomial equation of finite degree. Further, any set of coefficients generates a polynomial equation with a unique waveform. Finally, if the corresponding coefficients of two polynomial equations are similar, the polynomial equations will be similar in segment. Based upon the foregoing principles, the system and method detect a target segment in a digitized image by modelling the edges in the image with polynomial equations, identifying the coefficients for those equations, and comparing the coefficients to prestored coefficients that identify the target segment.

The segment detection system includes an imager for capturing an image of an object and converting the image into an electrical signal. A computer is connected to the camera for receiving the electrical signal. A machine vision system is associated with the computer and is adapted to analyze the image. A segment detection program is disposed in the computer for driving the computer and the machine vision system in accordance with the present invention.

The segment detection program includes an initialization subroutine and a matching subroutine. The initialization subroutine configures the program to search for a particular target polynomial equation that best fits the target segment. The target polynomial equation may be input by the user or a mechanism, or alternatively, may be derived by the program via a learning process by exposing the segment detection system to an object having a segment that is to serve as the target. In this latter scenario, the camera captures an image of the target object and passes the image to the computer. The machine vision system, under the control of the program, analyzes the target object and derives the target polynomial equation therefrom, which is then used as the reference for future test objects.

The matching subroutine of the segment detection program has a mechanism for deriving a test polynomial that represents a test from a test edge of the object based upon an analysis of the image. The matching subroutine further includes a mechanism for determining whether the test matches the target by comparing corresponding coefficients of the test polynomial equation and the target polynomial equation.

The present invention can also be conceptualized as providing a segment detection method for rapidly detecting a segment along an edge of an object in a digitized image. This method can be broadly summarized as follows: defining a target polynomial equation that represents a target segment; acquiring the image of the object; deriving a test polynomial equation that represents a test segment from a test edge of the object based upon an analysis of the image; and determining whether the test segment matches the target by comparing corresponding coefficients of the target and test polynomial equations.

Although not limited to this application, the segment detection system and method are particularly suited for detecting one or more segments along the periphery of an optical fiber connector, of a coupling grip for an optical fiber connector, or of an optical fiber. In general, the segment detection system and method may be utilized to locate any segment along an edge in a digitized image. Thus, the applications of the present invention are endless.

In addition to the features set forth previously, the segment detection system and method of the present invention have numerous advantages, a few of which are delineated hereafter, as merely examples.

An advantage is that the segment detection system and method can be utilized to quickly identify a segment in an edge of an image.

Another advantage is that orientations of objects can be contactlessly and quickly determined.

Another advantage is that an orientation of an object can be determined in seconds, rather than tens of minutes as would be required using known techniques.

Another advantage is that an edge in an image can be located via a simple mathematical model, thus requiring minimal computational overhead and complexity.

Another advantage is that, unlike other systems, the segment detection system offers immunity to both high and low frequency noise. In fact, it eliminates data contamination from low frequency noise by being capable of avoiding algorithm runaway due to noise bodies of intensities located at or in the vicinity of the main body intensity.

Another advantage is that the segment detection system uses a mathematical implementation that reduces the number of iterations necessary per measurement by several orders of magnitude, as compared to a prior art pattern matching technique.

Another advantage of the segment detection system is that it is guided by a mathematically fit model, and hence, infinite resolution is intrinsic due to is continuous nature. In other words, because the model can be a mathematical formulation derived from the real life model of the fiber optic connector or other object, the entire problem of resolution lost due to data discretization is replaced by a high performance model.

Another advantage is that the mathematical model provides for the determination of the orientation of a segment with subpixel resolution.

Other objects, features, and advantages of the present invention will become apparent to one with skill in the art upon examination of the following drawings and detailed description. It is intended that all such additional objects, features, and advantages be included herein within the scope of the present invention, as is defined in the claims.

BRIEF DESCRIPTION OF THE DRAWINGS

The segment detection system and method of the present invention can be better understood with reference to the following drawings. The drawings are not necessarily to scale, emphasis instead being placed upon clearly illustrating principles of the present invention. In the drawings, like reference numerals designate corresponding parts throughout the several views.

DETAILED DESCRIPTION OF THE PREFERRED EMBODIMENT

It will be obvious to those skilled in the art that many modifications and variations may be made to the preferred embodiment of the invention, as described hereafter, without substantially departing from the spirit and scope of the invention. It is intended that all such modifications and variations be included herein within the scope of the invention.

A. Detection System

Figure 1:
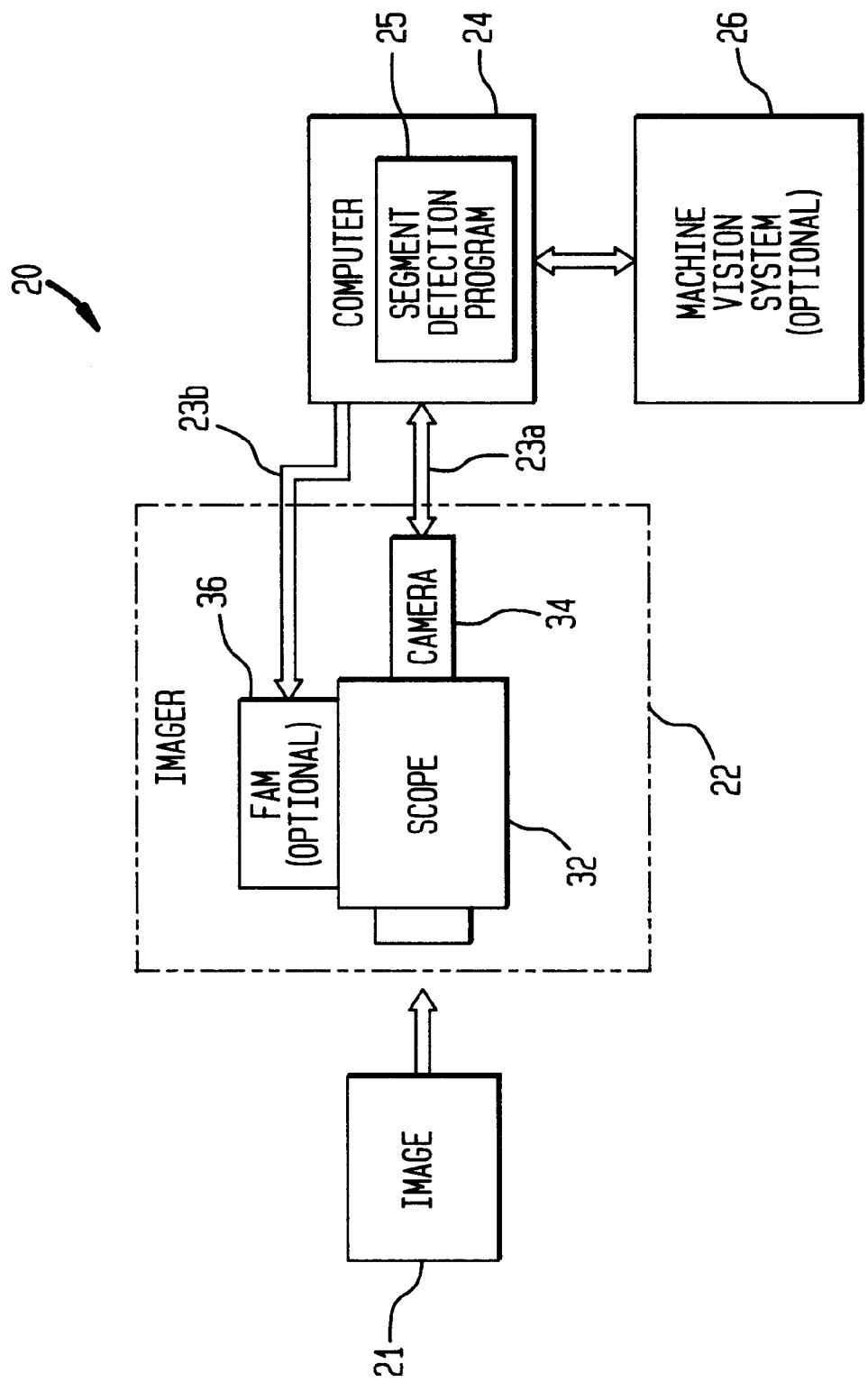
FIG. 1 is a block diagram illustrating the segment detection system and method of the present invention.
Figure 10:
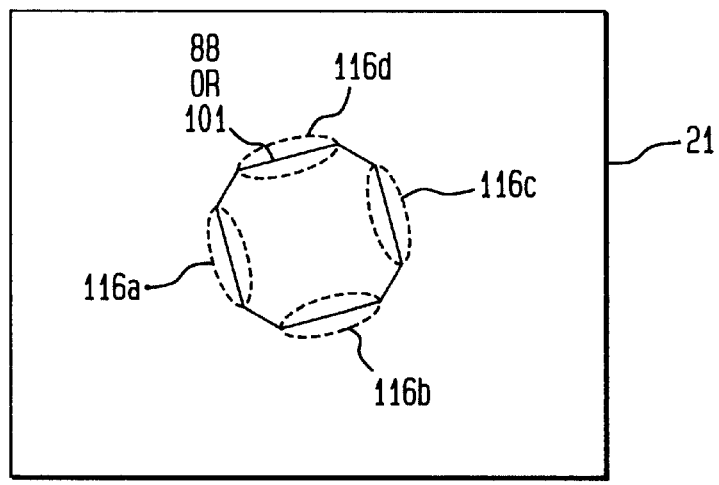
FIG. 10 is a schematic view of an image illustrating an end face of the coupling grip of FIG. 9 that is captured and analyzed by the segment detection system of FIG. 1.

The segment detection system 20 of the present invention is illustrated by way of a block diagram in FIG. 1. The segment detection system 20 can automatically, contactlessly, rapidly, and precisely detect a segment along an edge of an object from a digitized image 21 of the object. Although not limited to this application, the segment detection system 20 is particularly suited for determining the orientation of an optical connector or device, such as a coupling grip, to be engaged with the connector in a fully automated connector assembly line. This application will be described later in this document with reference to FIGS. 9 and 10.

In architecture, the preferred embodiment of the segment detection system 20 includes an imager 22 for capturing an image of an object, a computer 24 interfaced to the imager 22 for focusing the imager 22 and for receiving the image therefrom, and a machine vision system 26 (optional) interfaced to the computer 24 for processing the image under the control of the computer 24 and, particularly, the segment detection program 25 so that a segment can be learned and/or searched.

In the preferred embodiment, the imager 22 includes a scope 32, preferably a microscope with suitable magnification, for capturing an image 21, a camera 34 adapted to receive the image from the scope 32 and encode the image into electrical signal form, and a focus adjustment mechanism (FAM) 36 (optional) adapted to adjust the focus of the scope 32. The camera 34 can be any suitable imaging device for converting the image 21 into an electrical signal, but is preferably a charge coupled device (CCD). The CCD camera 34 comprises a pixel array for receiving light. Moreover, the pixel array encodes the image by generating analog voltage signals proportional to the intensity of light at each pixel of the CCD, as is well known in the art.

The FAM 36, which is an optional feature, can move the scope 32 or a part thereof so that the lens configuration within the scope 32 is moved to or from the object being imaged. A suitable FAM 36 is a piezoelectric transducer that can selectively move the scope 32 a distance based upon a closed loop control signal of voltage. The computer 24 provides a focus adjustment control 23b to the FAM 36, which signal may be amplified and/or buffered in order to generate the voltage signal that is used to move the scope 32.

A suitable FAM 36 is a model P721.00 piezoelectric transducer, which is manufactured by Physik Instrumente, Germany. The foregoing piezoelectric transducer can selectively move the scope 32 a distance of about 100 microns (with a resolution of about 3 nanometers) based upon a closed loop control signal of voltage between 0 and 100 volts. When 0 volts is supplied to the piezoelectric transducer 36, the focal point of the scope 32 is maintained at its greatest distance (it is completely retracted) from its target, whereas when 100 volts is supplied to the piezoelectric transducer 36, the focal point of the scope 32 is the closest distance (full extension) to the object.

When the model P721.00 piezoelectric transducer is utilized, the FAM 36 is provided with an amplifier (not shown for simplicity) for amplifying the focus adjustment control signal 23b so that the output to the piezoelectric element is within the voltage range of 0–100 volts. A suitable amplifier is a model E860.10 amplifier manufactured by and commercially available from Physik Instrumente, Germany.

Figure 2:
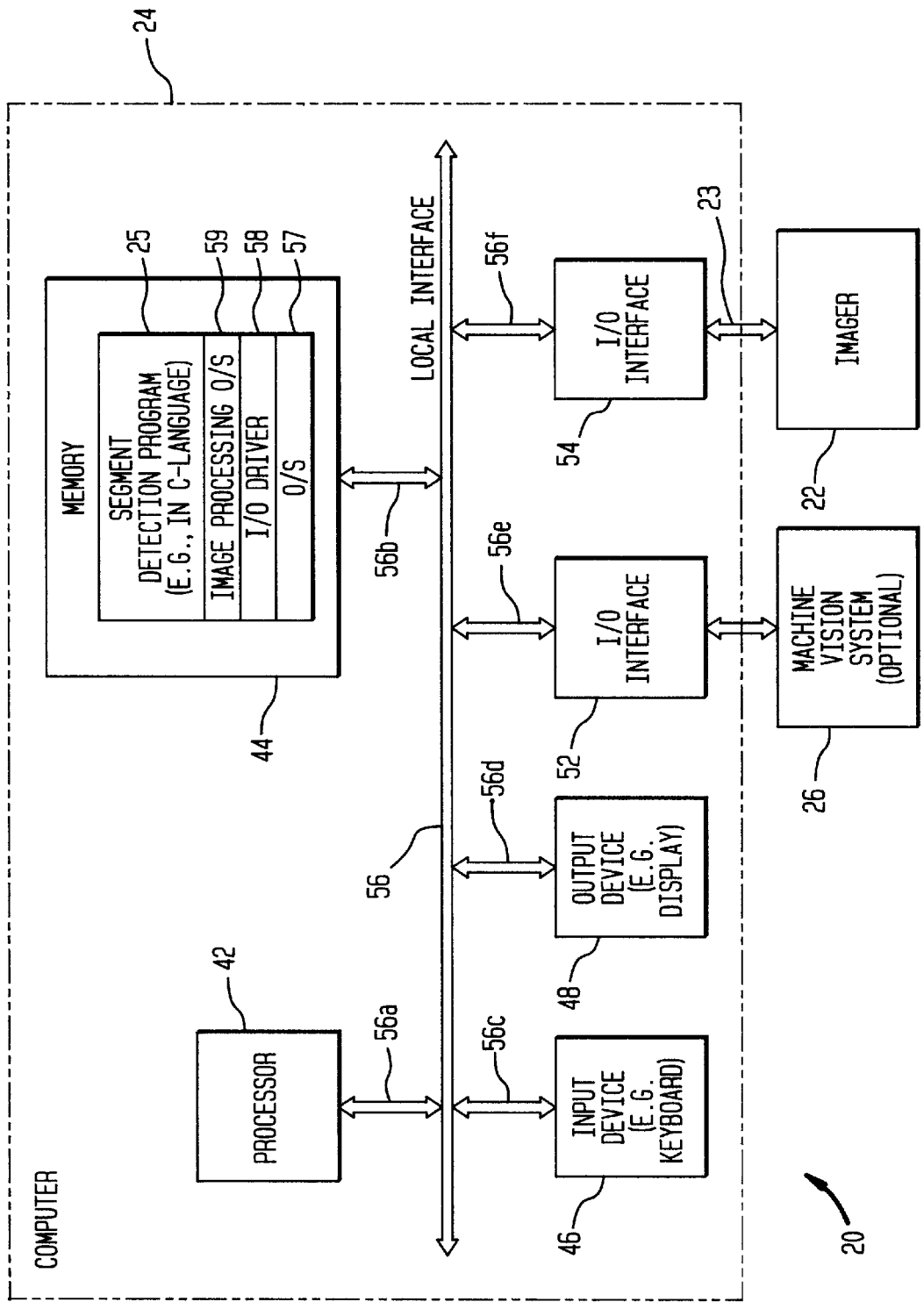
FIG. 2 is a block diagram illustrating the computer of FIG. 1 and its interface to the imager and machine vision system of FIG. 1.

The computer 24 can be any suitable computer system, many of which are known conventionally. A suitable computer is a model Globalyst 580 computer, which is commercially available from AT&T, USA. As shown in FIG. 2, the computer 24 includes a processor 42 for controlling and driving the computer 24 under the control of software and particularly the segment detection program 25, a memory 44 for storing the software for driving the processor 42, an input device 46, for example, a keyboard, mouse, track ball, etc., for providing inputs to the computer 24, an output device 48, for example, a display, printer, etc., for permitting the computer 24 to output relevant data, particularly, a target segment detection message, an input/output (I/O) interface 52 configured to provide an interface between the machine vision system 26 and the computer 24, an I/O interface 54 adapted to provide an interface between the imager 22 and the computer 24, and a local interface 56, which is preferably one or more buses, adapted to interface all of the aforementioned elements. It should be noted that all of the foregoing elements in this paragraph, except for the segment detection program 25, are well known in the art.

As mentioned, the memory 44 includes the software for controlling and driving the processor 42. Particularly, the memory 44 includes any suitable operating system (O/S) 57 to serve as the fundamental software platform for operating the computer 24, an I/O driver 58 residing hierarchically and logically over the O/S 57 for controlling the I/O interfaces 52, 54 and communications to/from the imager 22 and machine vision system 26, an image processing O/S 59 residing hierarchically and logically over the I/O driver 58 for handling image processing, and the segment detection program 25 residing hierarchically and logically over the image processing O/S 59 for implementing the novel surface analysis method of the present invention. The segment detection program 58 obtains a target segment and searches through the image 21 for the target segment based upon comparing coefficients of respective polynomial equations. The program 58 will be described in detail later in this document with reference to FIGS. 8 through 10.

The machine vision system 26, which is an optional feature but highly recommended due to its image processing capabilities, can be any suitable logic, processor, or computer that is conventional or custom made and that is configured to process the electrical signals from the imager 22. Many suitable machine vision systems are commercially available and their architectures and functionality are well known in the art. In the preferred embodiment, the machine vision system 26 is a model ITI ITEX OFG (overlay frame grabber) image processing card that is commercially available from Microdisk, Inc., U.S.A. This circuit board is plugged into the mother board associated with the computer 24.

B. Operation

In general, the segment detection system 20 operates as follows. A target segment on an edge of an object within the image 21 is modelled by an n-degree target polynomial equation, which is input by the user or a mechanism (e.g., another machine in an assembly line), or alternatively, may be derived by the program 25 via a learning process by exposing the segment detection system 20 to an object having a segment that is to serve as the target. In this latter scenario, the camera 34 (FIG. 1) captures an image 21 of the target object and passes the image to the computer 24. The machine vision system 26, under the control of the program 25, analyzes the target object and derives the target polynomial equation therefrom, the coefficients of which are then used as the reference for future test objects.

After this initialization process, the segment detection system 20 acquires an image 21 of a test object. Next, the program 25 analyzes test segments along the edges of the test object to determine if there is a sufficient match between the segments of the test object and the target object. A series of test polynomial equations are derived, each corresponding to a test segment in the image and each compared with the target polynomial equation. The comparison is accomplished by analyzing the coefficients of the respective test polynomial equation and the coefficients of the target polynomial equation. If the coefficients are matched within a predefined threshold, then it is concluded that the target segment has been located in the test image 21.

C. Segment Detection Program

The segment detection program 25 (FIGS. 1 and 2) implements the segment detection method, as previously described, in the computer 24. The segment detection program 25 will be described hereafter with reference to FIGS. 3 through 8.

The segment detection program 25 can be stored on any computer readable medium for use by or in connection with a computer related system or method. In the context of this document, a computer readable medium is an electronic, magnetic, optical, or other physical device or means that can contain or store a computer program for use by or in connection with a computer related system or method. Thus, for example, the novel segment detection program 25 can be stored and transported on a portable diskette, or as another example, the segment detection program could be stored in the memory of a computer, as is shown in FIG. 1, for the purpose of driving the computer when called upon.

Figure 3:
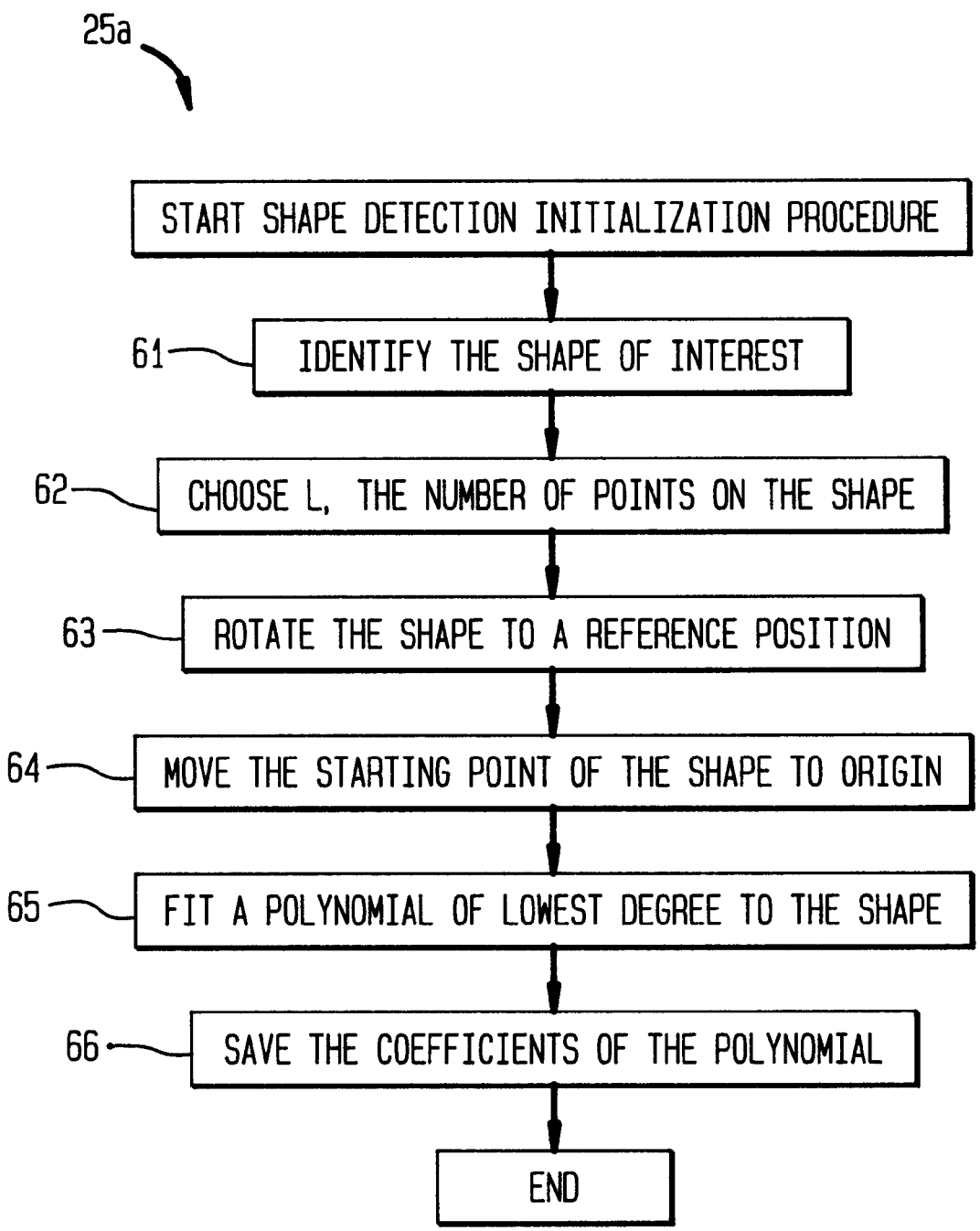
FIG. 3 is a flow chart illustrating an initialization subroutine of the segment detection program of FIG. 2 for acquiring a target polynomial equation.
Figure 7:
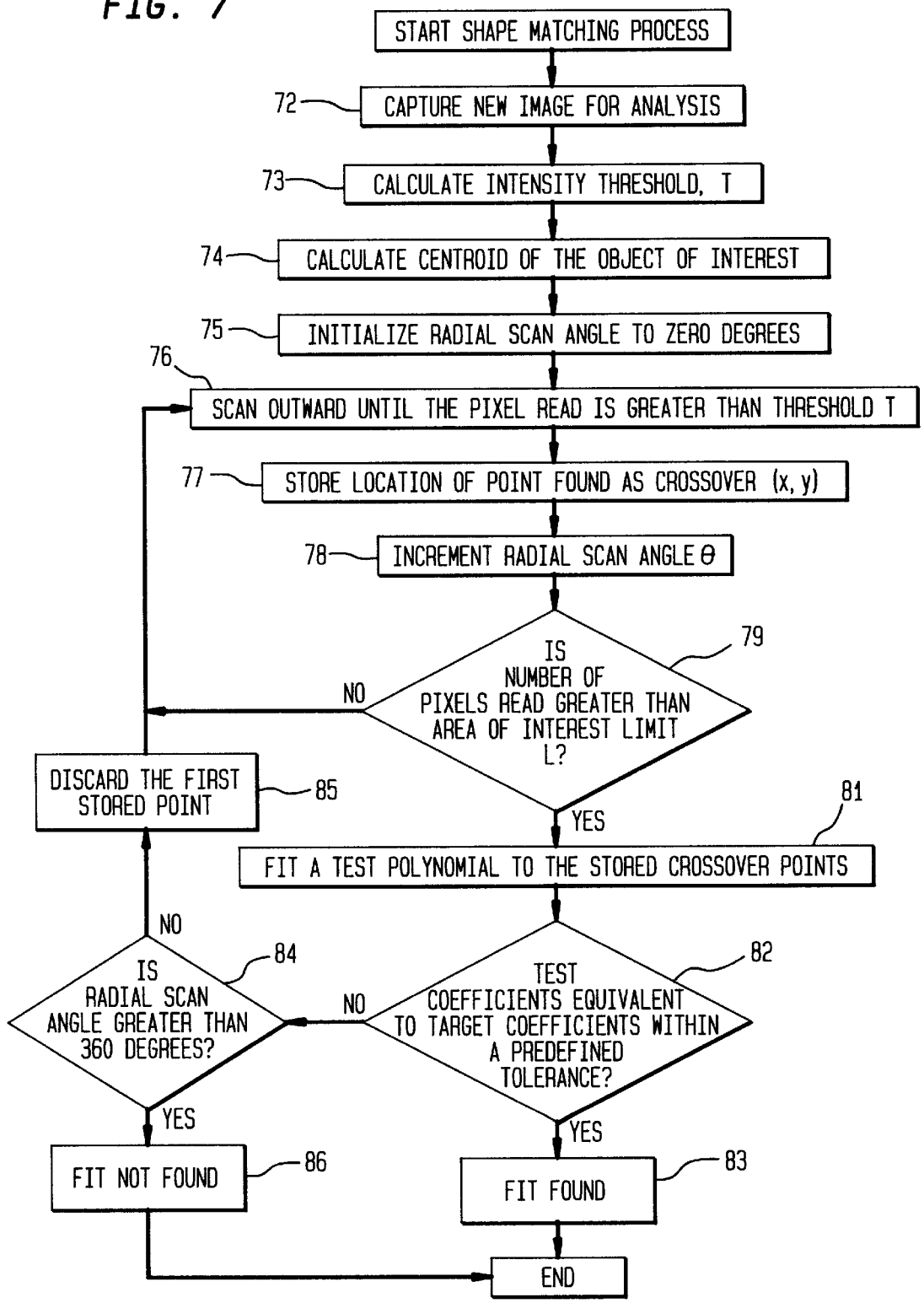
FIG. 7 is a flow chart illustrating a matching subroutine of the segment detection program of FIG. 2 for matching a test polynomial equation to a test polynomial equation.

In general, the segment detection program 25 includes an initialization subroutine 25a, as shown in FIG. 3, and a matching subroutine 25b, as shown in FIG. 7. The initialization subroutine 25a configures the program 25 to search for a particular target polynomial equation. The target polynomial equation may be input by the user or a mechanism (e.g., another machine in an assembly line) via input device 46 (FIG. 2), or alternatively, may be derived by the program 25 via a learning process by exposing the scope 32 (FIG. 1) of the segment detection system 20 to an object having a shape that is to serve as the target. The initialization subroutine 25a and the matching subroutine 25b are described in detail immediately hereafter.

1. Initialization Subroutine

As mentioned, the target polynomial equation may be input by the user or a mechanism, or alternatively, may be derived by the program 25 via a learning process. In the former scenario, the target coefficients can be input to the system 20, or in the alternative, an image of a target segment may be input or derived on the computer 24 and analyzed as would an actual captured image 21 of a target segment. In the latter scenario, the coefficients of the target segment are determined from an actual target segment of a target object as follows.

The segment detection program 25 performs an initialization subroutine as is shown by way of a flow chart in FIG. 3. The various blocks in the flow charts herein represent a list, modules, or blocks of executable instructions or code. Initially, at block 61, the target segment is identified. As mentioned, the target segment may be input to the computer 24. If an actual object is being analyzed by the scope 32, then the target segment on the object is identified by isolating or parsing a portion of the image containing the target segment.

At block 62, a number L of points on the target segment is defined by the user via input device 46 (FIG. 2), or alternatively, this number can be pre-established in the program. Block 62 transfers to block 63.

Figure 4:
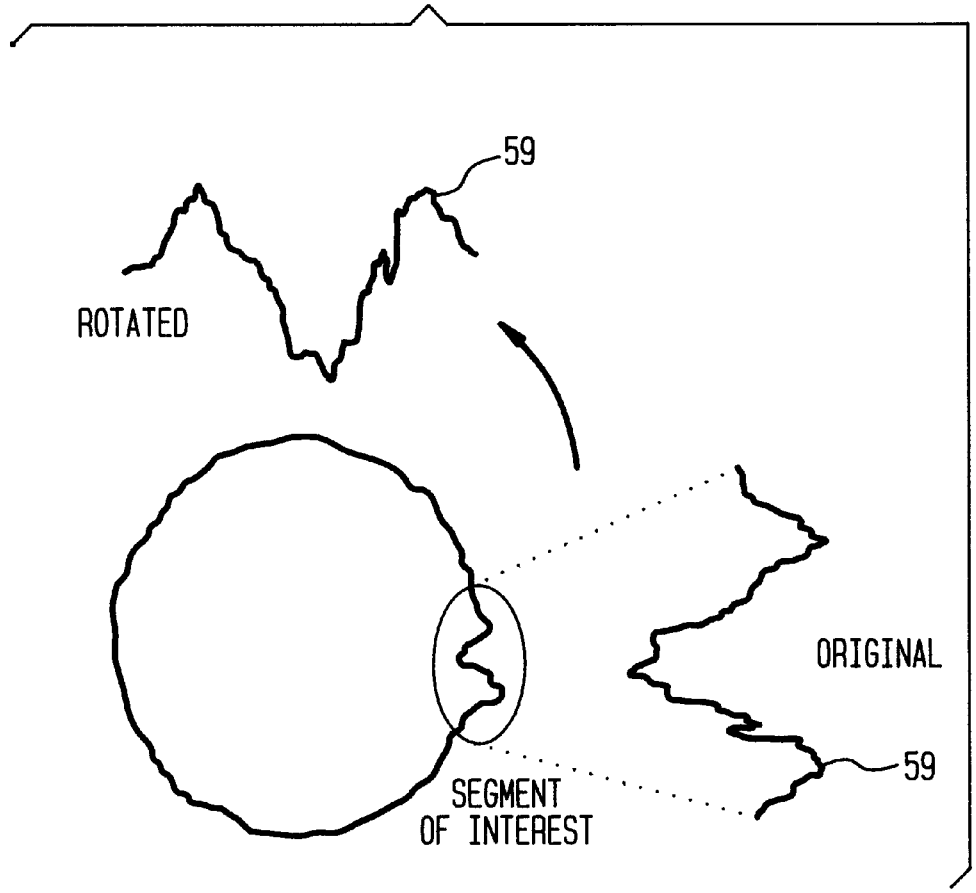
FIG. 4 is a graph illustrating an example of the sampling of a segment of interest (target or test) and rotation of the same, which operations are performed by the segment detection program of FIG. 2 during operation of the segment detection system of FIG. 1.

At block 63, the target segment is rotated in the image 21 to a reference orientation, as is shown by way of illustration in FIG. 4. The rotation is accomplished via the following equation:

$$\begin{bmatrix} x_{orig} \\ y_{orig} \end{bmatrix} = \begin{bmatrix} x_{rot} \\ y_{rot} \end{bmatrix} \begin{bmatrix} \cos\theta - \sin\theta \\ \sin\theta + \cos\theta \end{bmatrix} \quad (1)$$

where $x_{orig}, y_{orig}$ represent points on the original image 21 and $x_{rot}, y_{rot}$ represent points on the rotated image 21. In FIG. 4 and hereafter, a segment (target or test; in this case, target) is referred to by reference numeral 59. Block 63 transfers to block 64.

Figure 5:
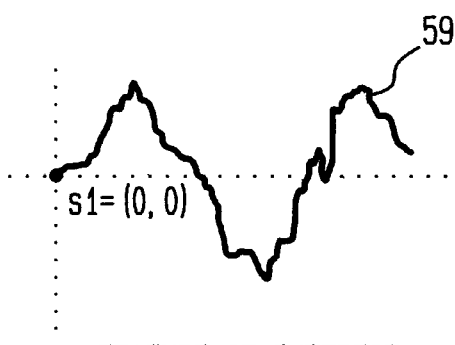
FIG. 5 is a graph illustrating an example of placement of the segment of interest (target or test) at a known origin (x,y=0,0) for analysis by the segment detection program of FIG. 2, after the rotation indicated in FIG. 4.

At block 64, the starting point of the target segment 59 is moved to a reference origin where coordinates x,y=(0,0) as is shown in FIG. 5. Block 64 transfers to block 65.

Figure 6:
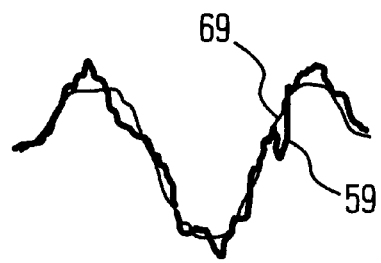
FIG. 6 is a graph illustrating an example of the fitting of a polynomial equation to the segment of interest (target or test) in FIG. 5 by the segment detection program of FIG. 2.

Next, at block 65, a polynomial 69, as shown in FIG. 6, of lowest degree is fit to the target segment 59 by choosing relevant points on the segment 59 and attempting to fit the polynomial 69 thereto. In other words, a first degree polynomial is attempted to be fit to the segment 59 first. If a first degree polynomial cannot be fit to the data, then a second degree polynomial is attempted to be fit, and so on, until an appropriate fit is achieved. Any suitable mathematical techniques can be employed to perform the fitting process, including but not limited to, a least squares technique, Newton's method, etc. The polynomial is given by the following:

$$\text{polynomial} = a_n x^n + a_{n-1} x^{n-1} + \ldots + a_0 \quad (2)$$

where $a_n, a_{n-1}, \ldots a_0$ are the polynomial coefficients. After the target polynomial 69 has been identified, block 65 transfers to block 66.

At block 66, the target polynomial coefficients $a_n, a_{n-1}, \ldots a_0$ are saved by the segment detection program 25 in the memory 44 (FIG. 2) of the computer 24 (FIG. 2). At this point, the initialization subroutine 25a concludes, and the segment detection system 20 (FIGS. 1 and 2) is now ready to analyze any test image 21 for the target polynomial coefficients.

2. Matching Subroutine

The matching subroutine 25b of the segment detection program 25 is illustrated by way of a flow chart in FIG. 7. The matching subroutine 25b is executed by the program 25 after the initialization subroutine 25a (FIG. 3) in order to search for the target segment in a test image 21.

First, at block 72, the matching subroutine 25b waits for an appropriate input to indicate that a test image 21 should be captured by the segment detection system 20 (FIG. 1). The input may be received from the user or any other system or mechanism. After the input is received, the subroutine 25b causes a test image 21 to be transferred from the camera 34 to the memory 44 for analysis.

Next, the general location of the test object within the test image 21 is identified. This task can be accomplished with any suitable image processing technique. For example, one or more vertical lines may be drawn across the image 21, and gradients along the lines may be analyzed in order to determine the location of the test object within the test image 21. This procedure is well known in the art of machine vision systems. After the location of the test object has been identified, block 72 transfers to block 73.

At block 73, a threshold T is calculated. The threshold T is determined so that all points within the boundary of the test object are either all lower or all greater than the threshold T. Block 73 transfers to block 74.

At block 74, the center $x_c, y_c$ of the test object is computed using any suitable technique. For example, the center can be calculated by the following procedure that utilizes moments calculations. The image is scanned in a raster manner through all pixel locations from coordinates x,y=0,0 to $x_{max}$, $y_{max}$. At each pixel location, the following equations are used to generate new values for the variables SUM, MOMENTx, MOMENTy:

$$SUM = SUM + (\text{pixel value at } x_i, y_i) \quad (3)$$

$$MOMENTx = MOMENTx + (\text{pixel value at } x_i, y_i) * x_i \quad (4)$$

$$MOMENTy = MOMENTy + (\text{pixel value at } x_i, y_i) * y_i \quad (5)$$

where SUM is the sum of pixel values at the coordinates $x_i, y_i$, MOMENTx is the cumulative moment relative to the coordinate x at the coordinates $x_i, y_i$, MOMENTy is the cumulative moment relative to the coordinate y at the coordinates $x_i, y_i$, and $x_i, y_i$ are the coordinates at the ith pixel in the scan. Furthermore, after the image has been scanned, the center $x_c, y_c$ is determined by the following equations:

$$x_c = MOMENTx/SUM \quad (6)$$

$$y_c = MOMENTy/SUM \quad (7)$$

where $x_c, y_c$, are the coordinates of the center. After the test object center is calculated, block 74 transfers to block 75.

At block 75, a direction angle θ is defined and is initialized at zero. The direction angle θ is utilized hereafter to scan, or retrieve, test segments 59 along the test object for analysis. Block 75 transfers to block 76.

At block 76, the matching subroutine 25b begins a loop which analyzes a plurality of test segments 59 in succession, until and if a target segment 59 is found in the test image 21. During each iteration of the loop, a different test segment 59 is analyzed.

Figure 8:
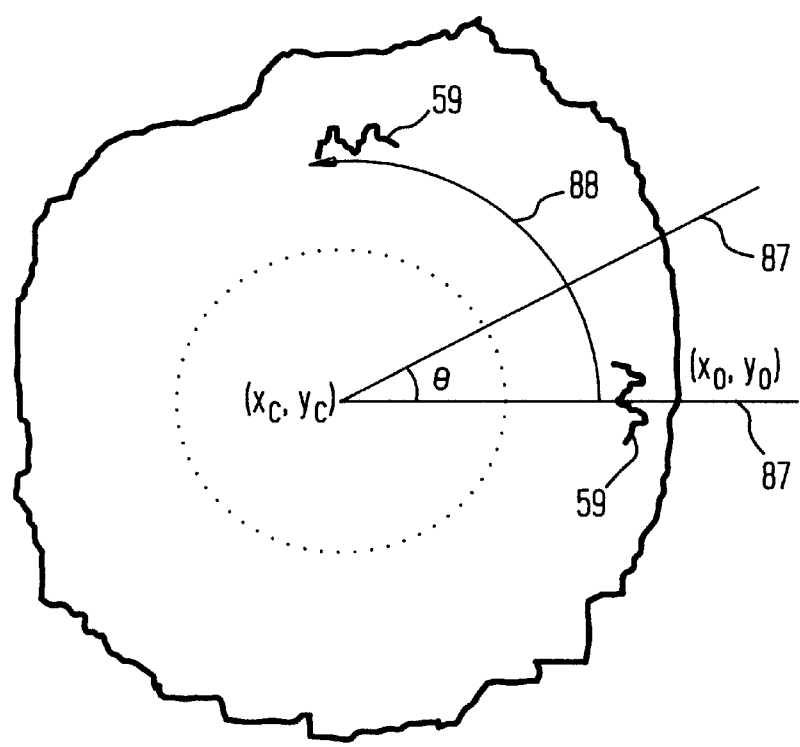
FIG. 8 is a graph illustrating the scanning process of the matching subroutine of FIG. 7.

As shown in FIG. 8, the matching subroutine 25b scans outwardly in the direction defined by the direction angle θ reading every pixel p until the value of p crosses the predefined threshold T. In a sense, the scan is along a radial line 87, commencing at the center $x_c, y_c$. Once the threshold T has been crossed, block 76 transfers to block 77, which stores the crossover point as $x_i, y_i$, where i is the crossover point number. If this is the first radial line scan, then the crossover point is $x_0, y_0$. The next crossover point is $x_1, y_1$, and so on.

Next, block 77 transfers to block 78, where the direction angle θ is incremented by a predefined resolution in order to define the next test segment 59 for analysis. The predefined resolution is input by the user to the computer 24 (FIG. 2) via the input device 46 (FIG. 2) or is preset in the software. In the preferred embodiment, the direction angle θ is set so that there is overlap between successive test segments 59. In fact, the direction angle θ can be set so that each test segment 59 is shifted by merely a single pixel along the edge of interest in the test object. After incrementing the direction angle θ, block 78 transfers to block 79.

At block 79, a determination is made as to whether the number of pixels that were read along the test segment 59 is greater than the length L. If it is not, then a complete test segment 59 has not yet been retrieved, and block 79 transfers back to block 76, where another scan along a radial line is accomplished at the new direction angle θ. However, if the number of pixels read is greater than the length L, then a complete test segment 59 has been retrieved, and block 79 transfers to block 81.

At block 81, a test polynomial equation is derived by fitting an equation to the crossover points $x_0, y_0, x_1 y_1, \ldots,$ $x_{L-1}, y_{L-1}$. Prior to the fitting process, the crossover points are rotated as shown in FIG. 4 in accordance with equation (1), indicated previously. This rotation insures a common reference frame for comparing the target and test polynomial equations. Any suitable mathematical technique can be used for fitting an equation to the stored crossover points to derive the test polynomial equation. The equation that is fitted is a polynomial of degree n, which is the same as the degree of the target polynomial equation defined during the initialization subroutine 25a (FIG. 3), and the coefficients $a'_n$, $a'_{n-1}, \ldots a'_0$ of the test polynomial equation are saved. Afterward, block 81 transfers to block 82.

At block 82, an inquiry is made as to whether the test coefficients of the test polynomial equation 69 correspond to the target coefficients of the target polynomial equation 69. The degree of correspondence, or fit, ε is calculated as follows:

$$\epsilon = |a'_n - n_a| + |a'_n - a'_n| + \ldots + |a'_n - a_n| \quad (8)$$

If ε is less than a predefined threshold F, then a match has been detected. In the alternative, when the degree of correspondence ε is greater than or equal to the threshold F, then a match has not been detected. If a match has been found, then the process is done, and block 82 transfers to block 83, which drives an appropriate message to the output device 48 (FIG. 2) indicating that the target segment has been detected in the test image. At this point, the program 25b concludes.

If the test and target coefficients do not correspond, then the block 82 transfers to block 84. At block 84, a determination is made as to whether the angle θ is less than 360°. In other words, a determination is made as to whether radial lines have been scanned around the entire test object. If not, then another test segment 59 should be retrieved, and block 84 transfers to block 85, which discards the first stored crossover point $x_0, y_0$. Moreover, block 85 transfers to block 76, which scans another radial line based upon the new direction angle θ that was derived previously at block 78. In essence, a new test segment 59 is defined and will be analyzed.

If at block 84 it is determined that the direction angle θ is less than 360°, then the entire test object has not yet been scanned, and block 84 transfers to block 86. Block 86 drives an appropriate message to the output device 48 (FIG. 2) to indicate that a fit has not been found, i.e., that the target segment has not been detected in the test image, and the matching subroutine 25b concludes.

D. Specific Application of Segment Detection System

Figure 9:
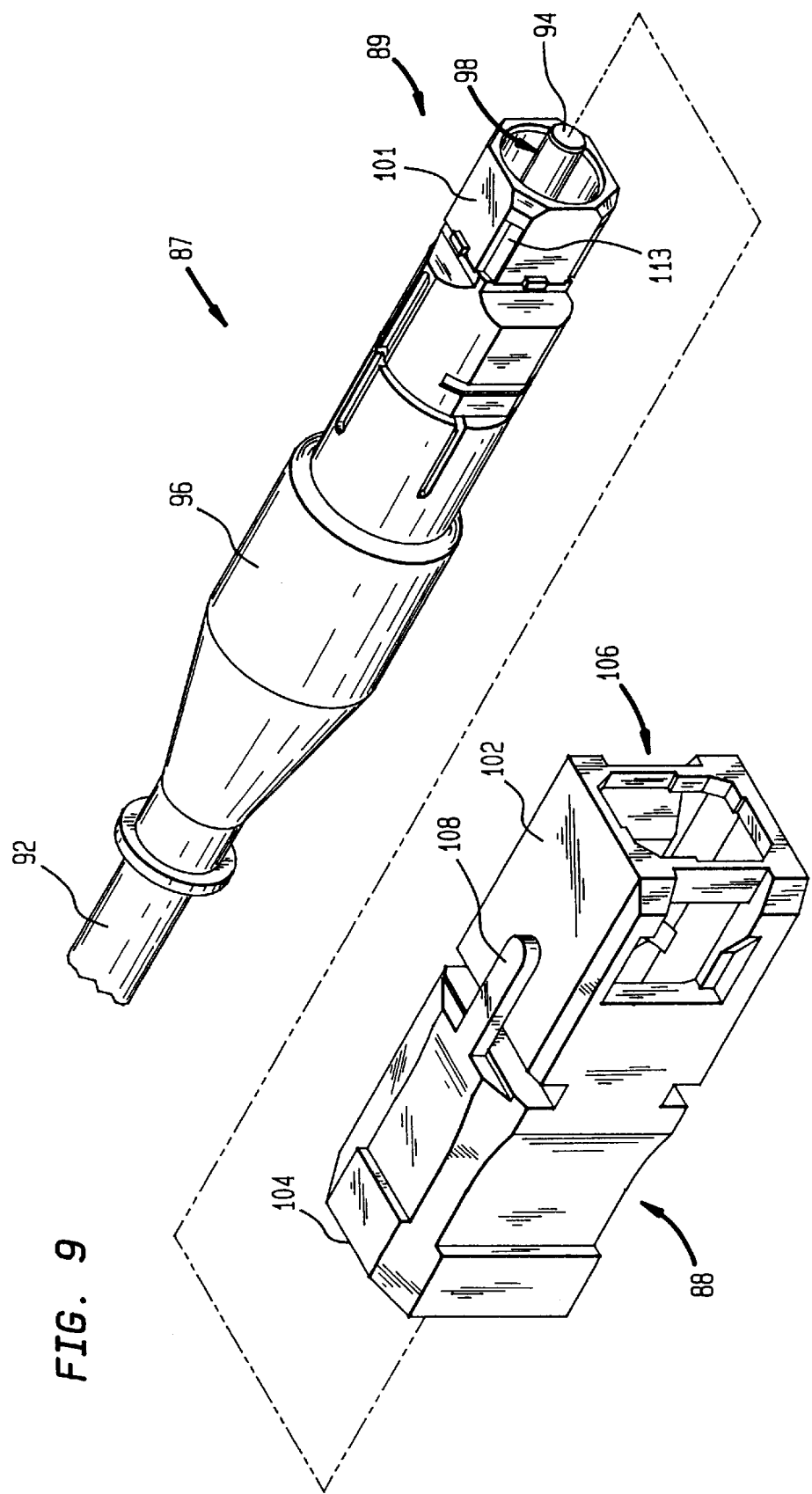
FIG. 9 is a perspective assembly view of a conventional SC optical fiber connector having a square-shaped coupling grip that is disposed over a square-shaped end tip of the SC optical connector.

The segment detection system 20 and associated method of the present invention are particularly suited for determining the orientation of an SC connector 87 or a coupling grip 88, both of which are shown in FIG. 9, so that the coupling grip 88 may be inserted about the end tip 89 of the connector 87. The SC connector 87 is described in detail in U.S. Pat. No. 5,212,752 to Stevenson et al., the disclosure of which is incorporated herein by reference. In general, the connector 87 includes a cable 92 having an optical fiber 94 (having a core and surrounding cladding) and one or more coating, insulating, shielding, and/or support layers, a connector body 96, and the end tip 89 situated about the termination of the fiber 94. The fiber 94 is surrounded by a plug 98. In a connection, the end face created by the plug 98 and fiber 94 is engaged with another end face of another connector 87 so that the fibers 94 of the separate connectors 87, and preferably the fiber cores, are precisely aligned.

The coupling grip 88 comprises an elongated plastic housing 102 having one end 104 into which the end tip 89 is inserted and an opposite end 106 which is adapted to be inserted into a coupling. A coupling is shown in FIG. 7 of U.S. Pat. No. 5,212,752. The coupling is made to cause the key 108 of the grip 88 to be received in a corresponding keyway of the coupling. At its end 106, the coupling grip 88 is formed with two locking nubs 111 formed in opposite internal corners. Each locking nub 111 is adapted to snap lock into a groove 113 along one of the chamfers of the end tip 89. This secures the end tip 89 to the grip 88.

For proper assembly, the orientation of the coupling grip 88 must be aligned with the orientation of the end tip 89 so that the square-shaped grip 88 can be slid over and locked to the square-shaped end tip 88. The coupling grip 88 can be placed over the end tip 89 with any of four possible orientations where the square-shaped interior of the grip 88 is aligned with the square-shaped exterior of the end tip 89. This is useful in that, if the eccentricity of the optical fiber core is known, then the coupling grip 88 can be placed over the end tip 89 in one of the four orientations so that the quadrant of eccentricity is identified. Moreover, when the coupling is utilized to connect two connectors 87, their respective quadrants of eccentricity can be aligned via the coupling.

When the segment detection system 20 (FIG. 1) is utilized to capture an image of the end tip 89 or the coupling grip 88 in an automated assembly line for producing connectors 87, an image 21, as shown in FIG. 9, is generated. As shown in FIG. 9, the connector end tip 89 or grip 88 is captured at its corresponding attitude with respect to the scope 32 (FIG. 1). In FIG. 9, it is shown skewed, as an example.

For this application, the segment detection program 25 (FIG. 2) learns or is programmed with a first degree target polynomial equation that represents a line. Moreover, the program 25 looks for the straight line segments 116a–116d of the image 21. In the preferred embodiment, the program 25 attempts to locate all four of the segments 116. Only one is necessary for the system to operate, but identification of at least two of the segments 116 is preferred, for integrity reasons.

Furthermore, a check can be employed by the program 25 after identification of the segments 116. In this regard, the distance between opposing segments 116 is checked against a known distance between these segments. If the calculated distance falls within a predefined threshold, then the check confirms the results. Otherwise, the check determines that the identified segments 116 are in fact in error.

In the claims hereafter, the structures, materials, acts, and equivalents of all means-plus-function elements and all step-plus-function elements are intended to include any structures, materials, or acts for performing the specified functions in combination with the other claimed elements.

Wherefore, the following is claimed:

1. A segment detection method for rapidly detecting a segment along an edge of an object in a digitized image, comprising the steps of:

defining a target polynomial equation that represents a target segment;

acquiring said image of said object;

deriving a test polynomial equation that represents a test segment from an edge of said object based upon an analysis of said image;

determining whether said test segment matches said target segment by comparing corresponding coefficients of said target and test polynomial equations;

analyzing in sequence a plurality of different test segments along said edge of said object to determine whether each matches said target segment; and acquiring successive test segments for analysis that include a predefined number of pixel locations along an edge of said object and that include overlapping pixel locations.

2. The method of claim 1, wherein said object is a portion of an optical fiber coupling grip.

3. The method of claim 1, wherein said object is a portion of an optical fiber connector.

4. The method of claim 1, wherein said test segment is linear.

5. The method of claim 1, wherein said step of defining said target polynomial equation includes the step of specifying target coefficients.

6. The method of claim 1, wherein said step of defining said target polynomial equation includes the steps of:

capturing an image of a target object having said target segment; and determining said target polynomial equation based upon an analysis of said image.

7. A segment detection method for rapidly detecting a segment along an edge of an object in a digitized image, comprising the steps of:

acquiring a first image of a first object;

deriving a first polynomial equation that represents a first segment in a first edge of said first object based upon analysis of said first image;

acquiring a second image of a second object;

deriving a second polynomial equation that represents a second segment from a second edge of said second object based upon an analysis of said second image;

determining whether said first and second segments match by comparing corresponding coefficients of said first and second polynomial equations; and acquiring successive segments for analysis that include a predefined number of pixel locations along an edge of each object and that include overlapping pixel locations.

8. The method of claim 7, wherein said second object is a portion of an optical fiber coupling grip.

9. The method of claim 7, wherein said second object is a portion of an optical fiber connector.

10. A segment detection system for rapidly detecting a segment along an edge of an object in a digitized image, comprising:

means for acquiring said image of said object;

means for deriving a test polynomial equation that represents a test segment from a test edge of said object based upon an analysis of said image;

means for determining whether said test segment matches a target segment by comparing corresponding coefficients of said test polynomial equation and a target polynomial equation that represents said target segment;

means for analyzing a plurality of different test segments along said edge of said object to determine whether each matches said target segment; and means for acquiring successive test segments for analysis that include a predefined number of pixel locations along an edge of said object and that include overlapping pixel locations.

11. A segment detection system for rapidly detecting a segment along an edge of an object in a digitized image, comprising:

a camera for capturing said image of said object;

a computer connected to said camera and having a machine vision system for receiving said image, said machine vision system having:

an initialization mechanism for deriving a test polynomial equation that represents a test segment from a test edge of said object based upon an analysis of said image; and a matching mechanism for determining whether said test segment matches a target segment by comparing corresponding coefficients of said test polynomial equation and a target polynomial equation that represents said target segment;

means for analyzing in sequence a plurality of different test segments along said edge of said object to determine whether each matches said target segment; and means for acquiring successive test segments for analysis that include a predefined number of pixel locations along an edge of said object and that include overlapping pixel locations.

12. The system of claim 11, wherein said object is a portion of an optical fiber coupling grip.

13. The system of claim 11, wherein said object is a portion of an optical fiber connector.

14. The system of claim 11, wherein said target and test segments are linear.

15. A computer readable medium having a segment detection program for rapidly detecting a segment along an edge of an object in a digitized image, the program comprising:

means for acquiring said image of said object;

means for deriving a test polynomial equation that represents a test segment from a test edge of said object based upon an analysis of said image;

means for determining whether said test segment matches a target segment by comparing corresponding coefficients of said test polynomial equation and a target polynomial equation that represents said target segment, means for analyzing a plurality of different test segments along said edge of said object to determine whether each matches said target segment: and means for acquiring successive test segments for analysis that include a predefined number of pixel locations along an edge of said object and that include overlapping pixel locations.

16. The medium of claim 15 disposed within a portable diskette.

17. The medium of claim 15 disposed within a computer and interconnected with a processor within said computer.

* * * * *